United States Patent
Fernandez

(10) Patent No.: US 11,732,597 B2
(45) Date of Patent: Aug. 22, 2023

(54) DOUBLE BOX COMPOSITE SEAL ASSEMBLY WITH INSERT FOR GAS TURBINE ENGINE

(71) Applicant: RAYTHEON TECHNOLOGIES CORPORATION, Farmington, CT (US)

(72) Inventor: Robin H. Fernandez, East Haddam, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/543,799

(22) Filed: Dec. 7, 2021

(65) Prior Publication Data
US 2022/0090509 A1 Mar. 24, 2022

Related U.S. Application Data

(62) Division of application No. 16/583,618, filed on Sep. 26, 2019, now Pat. No. 11,220,924.

(51) Int. Cl.
*F01D 11/00* (2006.01)
*F01D 11/16* (2006.01)
(Continued)

(52) U.S. Cl.
CPC ............ *F01D 11/005* (2013.01); *F01D 11/16* (2013.01); *F02C 7/28* (2013.01); *F05D 2230/60* (2013.01);
(Continued)

(58) Field of Classification Search
CPC ...... F01D 11/005; F01D 11/006; F01D 11/08; F01D 11/14; F01D 11/125; F01D 11/16;
(Continued)

(56) References Cited

U.S. PATENT DOCUMENTS

| 4,087,199 A | 5/1978 | Hemsworth et al. |
| 4,712,979 A | 12/1987 | Finger |

(Continued)

FOREIGN PATENT DOCUMENTS

| EP | 2441920 | 4/2012 |
| EP | 2469034 | 6/2012 |

(Continued)

OTHER PUBLICATIONS

Braided Composites. Retrieved Aug. 22, 2019 from: https://www.xcomposites.com/braided.html.

(Continued)

*Primary Examiner* — Eric J Zamora Alvarez
(74) *Attorney, Agent, or Firm* — Carlson, Gaskey & Olds, P.C.

(57) ABSTRACT

A seal assembly for a gas turbine engine includes a seal including a main body extending circumferentially between opposed mate faces. The main body has a sealing portion and an engagement portion extending outwardly from sealing portion along at least one of the mate faces. The main body has a core including one or more core plies arranged to establish an internal cavity. An overwrap has one or more overwrap plies arranged to follow a perimeter of the one or more core plies to establish the engagement portion and the sealing portion. A platform insert extends between portions of the core and the overwrap to establish the sealing portion. A method of fabricating a seal for a gas turbine engine is also disclosed.

20 Claims, 12 Drawing Sheets

(51) Int. Cl.
*F02C 7/28* (2006.01)
*F01D 11/08* (2006.01)

(52) U.S. Cl.
CPC ...... *F05D 2240/11* (2013.01); *F05D 2240/55* (2013.01)

(58) Field of Classification Search
CPC . F01D 9/04; F01D 5/225; F01D 25/24; F01D 25/28; F01D 25/246; F02C 7/28; F05D 2230/60; F05D 2230/64; F05D 2240/11; F05D 2240/55; F05D 2250/75; F05D 2260/30; F05D 2300/6033; F05D 2300/6034; F05D 2300/603; F05D 2300/614; F05D 2300/2261; Y02T 50/60; C04B 2235/5244; C04B 2235/5252; C04B 2235/5256; C04B 2235/614; C04B 2235/616; C04B 35/52; C04B 35/573; C04B 35/80; C04B 35/83
See application file for complete search history.

(56) References Cited

U.S. PATENT DOCUMENTS

| | | | |
|---|---|---|---|
| 4,738,902 A * | 4/1988 | Prewo | F23R 3/007 428/114 |
| 4,847,063 A * | 7/1989 | Smith | C04B 35/83 87/9 |
| 5,413,458 A | 5/1995 | Calderbank | |
| 6,508,620 B2 | 1/2003 | Sreekanth et al. | |
| 6,733,235 B2 | 5/2004 | Alford et al. | |
| 6,997,673 B2 | 2/2006 | Morris et al. | |
| 7,434,670 B2 | 10/2008 | Good et al. | |
| 7,604,456 B2 | 10/2009 | Schiavo, Jr. et al. | |
| 7,625,172 B2 | 12/2009 | Walz et al. | |
| 7,771,159 B2 * | 8/2010 | Johnson | F16J 15/104 277/654 |
| 8,016,546 B2 | 9/2011 | Surace et al. | |
| 8,246,299 B2 | 8/2012 | Razzell et al. | |
| 8,251,652 B2 | 8/2012 | Campbell et al. | |
| 8,740,552 B2 | 6/2014 | Marusko et al. | |
| 8,784,037 B2 | 7/2014 | Durocher et al. | |
| 8,790,067 B2 | 7/2014 | McCaffrey et al. | |
| 8,834,105 B2 | 9/2014 | Albers et al. | |
| 9,039,358 B2 | 5/2015 | Tholen et al. | |
| 9,080,457 B2 | 7/2015 | Shi | |
| 9,726,043 B2 | 8/2017 | Franks et al. | |
| 10,077,670 B2 | 9/2018 | McCaffrey | |
| 10,087,784 B2 | 10/2018 | Shapiro et al. | |
| 10,196,918 B2 | 2/2019 | McCaffrey | |
| 10,202,860 B2 | 2/2019 | Hillier | |
| 10,221,712 B2 | 3/2019 | Ruthemeyer et al. | |
| 10,329,201 B2 | 6/2019 | Steibel et al. | |
| 10,370,998 B2 | 8/2019 | Vetters et al. | |
| 2004/0076520 A1 | 4/2004 | Dellmann et al. | |
| 2008/0190114 A1 | 8/2008 | Surace et al. | |
| 2009/0028692 A1 | 1/2009 | Surace et al. | |
| 2011/0293410 A1 | 12/2011 | Marusko et al. | |
| 2012/0171027 A1 | 7/2012 | Albers et al. | |
| 2013/0055882 A1 * | 3/2013 | Egres, Jr. | F41H 5/0485 89/36.02 |
| 2014/0023490 A1 | 1/2014 | Hillier | |
| 2016/0097303 A1 | 4/2016 | Baldiga et al. | |
| 2016/0258304 A1 | 9/2016 | Sippel et al. | |
| 2016/0333741 A1 | 11/2016 | Stapleton | |
| 2016/0376921 A1 | 12/2016 | O'Leary et al. | |
| 2017/0204737 A1 | 7/2017 | Varney et al. | |
| 2017/0350268 A1 * | 12/2017 | McCaffrey | F01D 25/28 |
| 2018/0023408 A1 | 1/2018 | Rice et al. | |
| 2018/0251921 A1 * | 9/2018 | Shi | F23R 3/007 |
| 2018/0298773 A1 | 10/2018 | Vetters | |
| 2018/0371930 A1 | 12/2018 | Sippel et al. | |
| 2019/0063249 A1 | 2/2019 | McCaffrey | |

FOREIGN PATENT DOCUMENTS

| | | |
|---|---|---|
| EP | 2562365 | 2/2013 |
| EP | 3044415 | 7/2016 |
| EP | 3543484 | 9/2019 |
| EP | 3575558 | 12/2019 |
| JP | H10103014 | 4/1998 |

OTHER PUBLICATIONS

Kelkar, A.D. and Whitcomb, J.D. (2009). Characterization and structural behavior of braided composites U.S. Department of Transportation. DOT/FAA/AR-08/52. Jan. 2009. pp. 1-181.
Cox, B.N. and Flanagan, G. (1997). Handbook of analytical methods of textile composites. NASA-CR-4750. Mar. 1, 1997. pp. 1-161.
Naik, R.A. (1994). Analysis of woven and braided fabric reinforced composites. NASA-CR-194930 Jun. 1994. pp. 1-48.
Melenka, G.W. and Carey, J.P. (2015). Development of an analytical model for tubular braided composites. 20th International Conference on Composite Materials. Copenhagen. Jul. 19-24, 2015. pp. 1-12.
XComposites. Retrieved Aug. 22, 2019 from: https://www.xcomposites.com/.
Technical Manual. Aviation Unit Maintenance (AVUM) and Aviation Intermediate Maintenance (AVIM) manual for general aircraft maintenance (sheet metal shop vol. 11). Figure 4-8. TM 1-1500-204-23-11. Retrieved from: http://aviationmaintenance.tpub.com/TM-1-1500-204-23-11/TM-1-1500-204-23-1100077.html.
European Search Report for European Patent Application No. 20198240.2 completed Jan. 20, 2021.

* cited by examiner

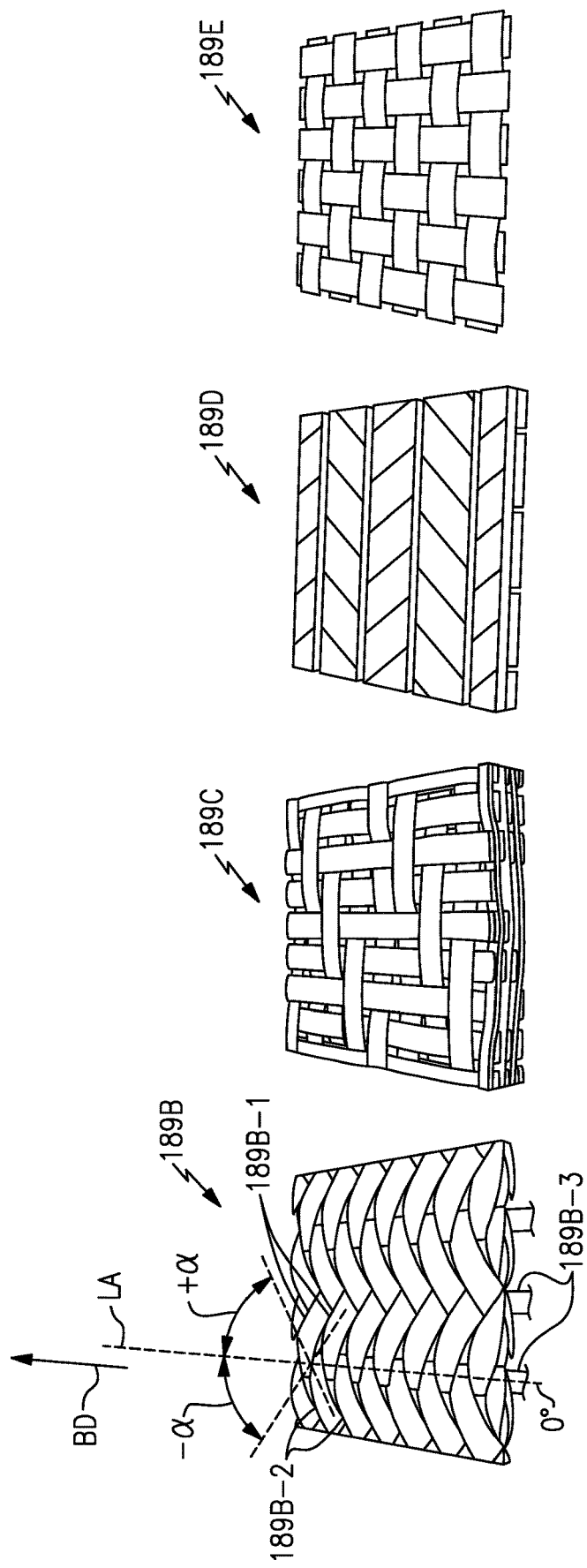

DOUBLE BOX COMPOSITE SEAL ASSEMBLY WITH INSERT FOR GAS TURBINE ENGINE

CROSS-REFERENCE TO RELATED APPLICATIONS

This application is a divisional of U.S. application Ser. No. 16/583,618, filed Sep. 26, 2019.

BACKGROUND

This disclosure relates to sealing for adjacent components of a gas turbine engine.

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged in an array. The arc segments are exposed to relatively hot gases in the gas flow path and may be configured to receive cooling airflow to cool portions of the shrouds.

SUMMARY

A seal assembly for a gas turbine engine according to an example of the present disclosure includes a seal including a main body extending circumferentially between opposed mate faces. The main body has a sealing portion and an engagement portion extending outwardly from sealing portion along at least one of the mate faces. The main body has a core including one or more core plies having a first fiber construction comprising substantially continuous fibers and arranged to establish an internal cavity. An overwrap has one or more overwrap plies having a second fiber construction comprising substantially continuous fibers and are arranged to follow a perimeter of the one or more core plies to establish the engagement portion and the sealing portion. The second fiber construction differs from the first fiber construction. A platform insert extends between portions of the core and the overwrap to establish the sealing portion. The platform insert has a construction that differs from the first and second fiber construction.

In a further embodiment of any of the foregoing embodiments, the internal cavity spans circumferentially between the mate faces.

In a further embodiment of any of the foregoing embodiments, the platform insert is dimensioned to extend within the sealing portion between opposed portions of the overwrap.

In a further embodiment of any of the foregoing embodiments, the platform insert comprises a metal material and/or a ceramic material.

In a further embodiment of any of the foregoing embodiments, the platform insert includes at least one intermediate ply situated between portions of the core and the overwrap to establish the sealing portion, and the at least one intermediate ply has a third fiber construction of substantially discontinuous fibers.

In a further embodiment of any of the foregoing embodiments, the at least one intermediate ply comprises a fabric.

In a further embodiment of any of the foregoing embodiments, the fabric is woven.

In a further embodiment of any of the foregoing embodiments, the one or more core plies are triaxially braided.

In a further embodiment of any of the foregoing embodiments, the one or more overwrap plies are biaxially braided.

A further embodiment of any of the foregoing embodiments includes at least one mounting block including an interface portion extending from a mounting portion. The engagement portion includes a pair of openings along respective ones of the mate faces, and the interface portion is dimensioned to be inserted into one of the openings to limit relative movement between the at least one mounting block and the seal.

In a further embodiment of any of the foregoing embodiments, the platform insert is dimensioned to extend between opposed portions of the overwrap that establish leading and trailing edge segments of the sealing portion. The leading and trailing edge segments extend circumferentially between the mate faces. The one or more core and overwrap plies include silicon carbide fibers embedded in a ceramic matrix. The one or more core plies comprise a plurality of core plies that are triaxially braided and include axial tows interlaced with bias tows, and a bias angle of each of the bias tows is between approximately 60 degrees and approximately 70 degrees, absolute. The one or more overwrap plies comprise a plurality of overwrap plies that are biaxially braided and include a first set of bias tows interlaced with a second set of bias tows, and a bias angle of each of the first and second sets of bias tows is between approximately 30 degrees and approximately 40 degrees, absolute. The fabric is a 5 or 8 harness satin weave including warp tows interlaced with weft tows, and the warp tows or the weft tows are dimensioned to substantially span between the mate faces.

In a further embodiment of any of the foregoing embodiments, the seal is a blade outer air seal (BOAS).

A gas turbine engine according to an example of the present disclosure includes an engine case extending along an engine axis, an array of blades rotatable about the engine axis, and an array of blade outer air seals distributed about the array of blades to bound a gas path. Each of the seals have a sealing portion extending circumferentially between opposed mate faces and an engagement portion extending outwardly from the sealing portion. The mate faces are arranged to define an intersegment gap with the mate faces of adjacent seals. Braided core plies having a first fiber construction including substantially continuous fibers are arranged to establish an internal cavity. An overwrap having braided overwrap plies is arranged to follow a perimeter of the core plies to establish the engagement portion and the sealing portion. The overwrap plies have a second fiber construction comprising substantially continuous fibers, and the second fiber construction differs from the first fiber construction. A platform insert extends between portions of the core and the overwrap to establish the sealing portion, and the platform insert has a construction that differs from the first and second fiber construction. An array of circumferentially spaced apart mounting blocks are each arranged between the engagement portion of adjacent pairs of the seals to secure the seals to the engine case.

In a further embodiment of any of the foregoing embodiments, the mounting blocks are mechanically attached to the engine case. The mounting blocks span across the intersegment gap established by the mate faces of the respective adjacent pair of seals. Each of the mounting blocks includes an interface portion having a dovetail geometry that extends through an opening along a respective one of the mate faces to mate with ramped surfaces of the internal cavity and limit movement of the respective seal relative to the engine case.

In a further embodiment of any of the foregoing embodiments, the platform insert includes at least one intermediate ply having a third fiber construction of substantially discontinuous fibers.

In a further embodiment of any of the foregoing embodiments, the at least one intermediate ply comprises a woven fabric, the core plies are triaxially braided, and the overwrap plies are biaxially braided.

In a further embodiment of any of the foregoing embodiments, the core and overwrap plies include silicon carbide fibers embedded in a ceramic matrix.

A method of fabricating a seal for a gas turbine engine according to an example of the present disclosure includes forming a core including triaxially braided core plies along at least one mandrel, and positioning a platform insert including at least one intermediate ply along the core. The at least one intermediate ply has a third fiber construction of substantially discontinuous fibers forming an overwrap including biaxially braided overwrap plies that establish a passageway. The core plies and the platform insert at least partially into the passageway such that the core, the platform insert and the overwrap cooperate to establish a sealing portion extending circumferentially between opposed mate faces and such that the core plies, and such that the core and the overwrap cooperate to establish an engagement portion having an opening along each of the opposed mate faces. The opening is dimensioned to receive a respective mounting block.

In a further embodiment of any of the foregoing embodiments, the core plies and the overwrap plies comprise silicon carbide fibers, and further include embedding the silicon carbide fibers in a ceramic matrix.

In a further embodiment of any of the foregoing embodiments, the at least one mandrel is a pair of mandrels arranged in an opposed relationship. The method further includes removing the pair of mandrels from the core to establish an internal cavity spanning circumferentially between the openings along the mate faces. The steps of forming the core and the overwrap occur such that the biaxially and triaxially braided plies and the at least one intermediate ply span between the mate faces. The step of forming the core occurs such that a bias angle of bias tows in the respective core plies is between 60 degrees and 70 degrees, absolute. The step of forming the overwrap occurs such that a bias angle of bias tows in the respective overwrap plies is between 30 degrees and 40 degrees, absolute.

The various features and advantages of this invention will become apparent to those skilled in the art from the following detailed description of an embodiment. The drawings that accompany the detailed description can be briefly described as follows.

BRIEF DESCRIPTION OF THE DRAWINGS

FIG. 12B illustrates triaxially braided yarns.
FIG. 12C illustrates a three-dimensional woven fabric.
FIG. 12D illustrates a non-crimp fabric.
FIG. 12E illustrates a two-dimensional fabric.

DETAILED DESCRIPTION

Figure 1:
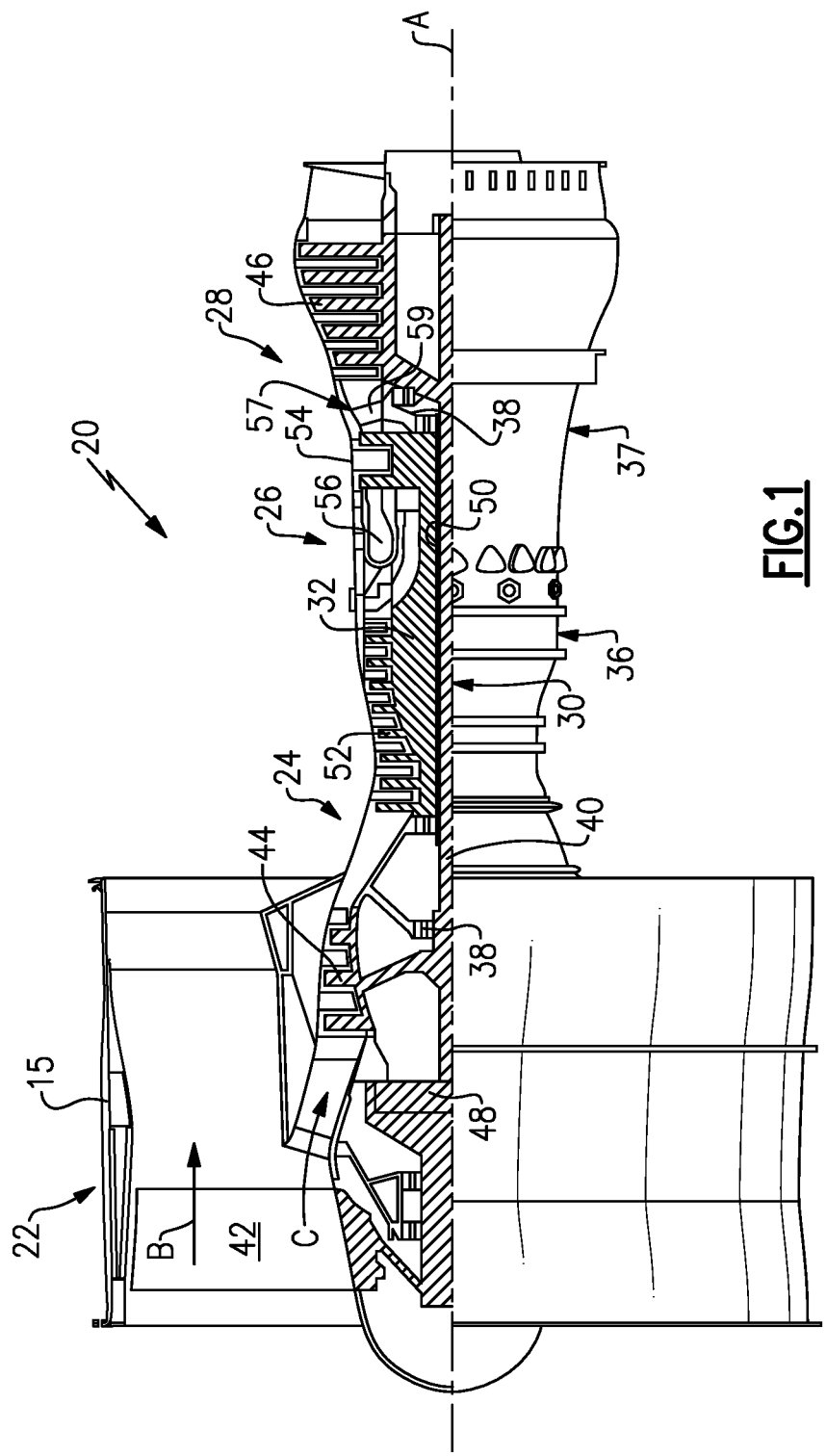
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
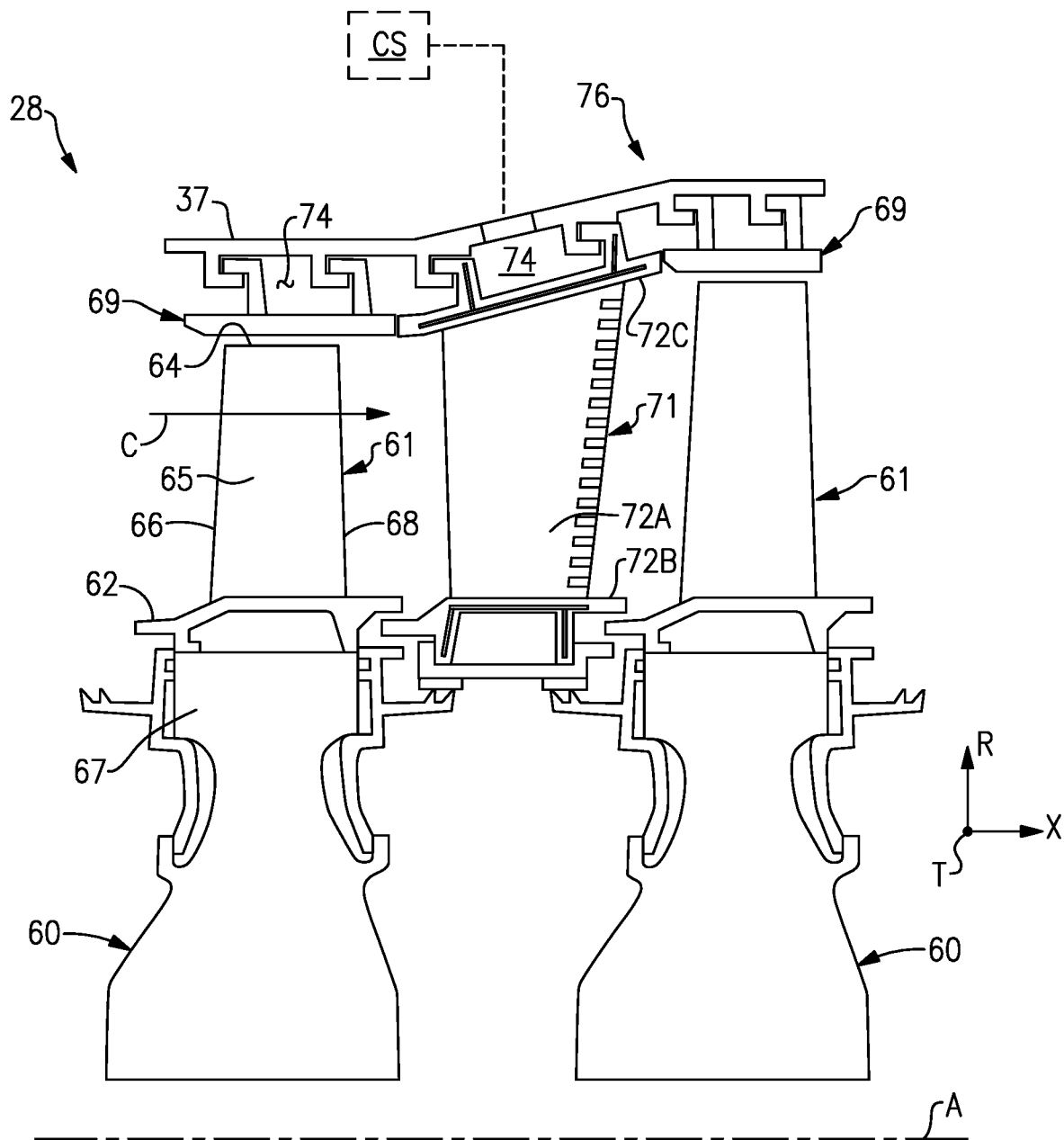
FIG. 2 shows an airfoil arrangement for a turbine section.

FIG. 2 shows selected portions of the turbine section 28 including a rotor 60 carrying one or more blades or airfoils 61 that are rotatable about the engine axis A. In this disclosure, like reference numerals designate like elements where appropriate and reference numerals with the addition of one-hundred or multiples thereof designate modified elements that are understood to incorporate the same features and benefits of the corresponding original elements. Each airfoil 61 includes a platform 62 and an airfoil section 65 extending in a radial direction R from the platform 62 to a tip 64. The airfoil section 65 generally extends in a chordwise or axial direction X between a leading edge 66 and a trailing edge 68. A root section 67 of the airfoil 61 is mounted to, or integrally formed with, the rotor 60. A blade outer air seal (BOAS) 69 is spaced radially outward from the tip 64 of the airfoil section 65. The BOAS 69 can include a plurality of seal arc segments (one exemplary BOAS shown in FIG. 5 at 169) that are circumferentially arranged in an annulus around the engine axis A. An array of the BOAS 69 are circumferentially distributed about an array of the airfoils 61 to bound a gas path such as the core flow path C.

A vane 71 is positioned along the engine axis A and adjacent to the airfoil 61. The vane 71 includes an airfoil section 72A extending between an inner platform 72B and an outer platform 72C to define a portion of the core flow path C. The turbine section 28 includes an array of airfoils 61, vanes 70, and BOAS 69 arranged circumferentially about the engine axis A.

One or more cooling sources CS (one shown) are configured to provide cooling air to one or more cooling cavities or plenums 74 defined by an engine static structure such as the engine case 37 or another portion of the engine static structure 36 (FIG. 1). In the illustrated example of FIG. 2, the plenums 74 are defined between an engine case 37 and the outer platform 72C and/or BOAS 69. The engine case 37 provides a portion of the engine static structure 36 (FIG. 1) and extends along the engine axis A. The plenums 74 are configured to receive pressurized cooling flow from the cooling source(s) CS to cool portions of the airfoil 61, BOAS 69 and/or vane 70. Cooling sources CS can include bleed air from an upstream stage of the compressor section 24 (FIG. 1), bypass air, or a secondary cooling system aboard the aircraft, for example. Each of the plenums 74 can extend in a circumferential or thickness direction T between adjacent airfoils 61, BOAS 69 and/or vanes 70. The tips 64 of each of the airfoil sections 65 and adjacent BOAS 69 are in close radial proximity to reduce the amount of gas flow that escapes around the tips 64 through a corresponding clearance gap.

Figure 3:
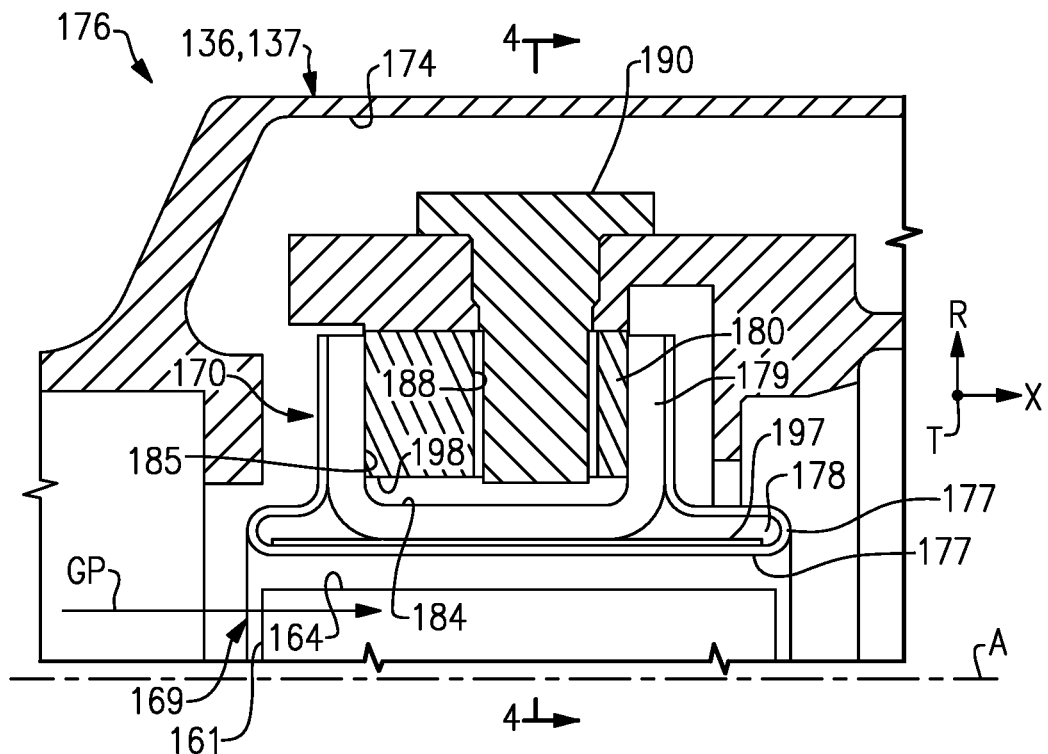
FIG. 3 illustrates a sectional view of a seal assembly.
Figure 4:
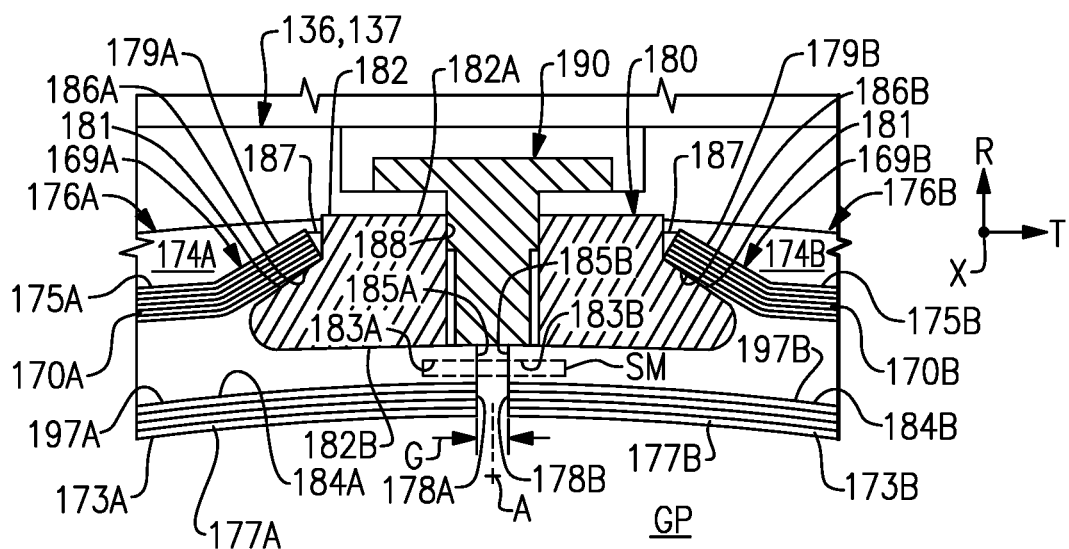
FIG. 4 illustrates a sectional view of the seal assembly taken along line 4-4 of FIG. 3, with the seal assembly arranged adjacent to another seal assembly.

FIGS. 3-9 illustrate an exemplary seal assembly 176 including a seal 169 for a gas turbine engine, which can be incorporated into the engine 20 of FIG. 1 or the turbine section 28 of FIG. 2, for example. In the illustrated example of FIGS. 3-9, the seal 169 is a blade outer air seal (BOAS). FIG. 3 is sectional view of the seal assembly 176 in an installed position. FIG. 4 is a sectional view of an adjacent pair of seal assemblies 176 (indicated as 176A, 176B). Although the components discussed herein primarily refer to a BOAS in the turbine section 28, the teachings herein can also be utilized for other components of the engine 20, such as one of the platforms 62, 72B, 72C, an upstream stage of the compressor section 24, or combustor panels or liners defining portions of a combustion chamber located in the combustor section 26, and exhaust nozzles.

Referring to FIG. 3, each seal assembly 176 includes a seal 169 and at least one support or mounting block 180.

Each seal 169 is arranged in close proximity to an airfoil tip 164 during operation of the engine. An array of the seals 169 are distributed about an array of blades or airfoils 161 to bound a gas path GP. One pair of seals 169A, 169B is shown in FIG. 4 for illustrative purposes. The gas path GP can be a portion of the core flow path C of FIGS. 1-2, for example.

Figure 5:
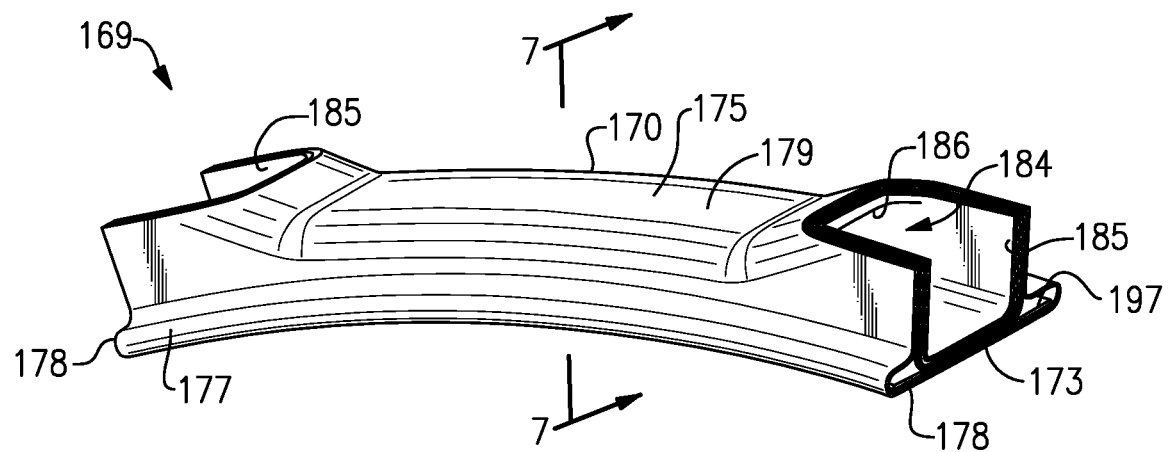
FIG. 5 illustrates a perspective view of a seal.

Referring to FIGS. 3-5, the seal 169 includes a main body 170 that extends circumferentially between opposed (or first and second) mate faces 178. The main body 170 can have a generally elongated and arcuate profile, as illustrated by FIGS. 4-5. The seal 169 includes a sealing portion 177 that extends circumferentially between the mate faces 178. The sealing portion 177 includes a seal face 173 that extends circumferentially between the mate faces 178, with exposed surfaces of the seal face 173 bounding the gas path GP. The main body 170 includes an engagement portion 179 extending radially outwardly from the sealing portion 177. The engagement portion 179 extends radially outwardly from the sealing portion 177 along at least one of the mate faces 178. In the illustrative example of FIG. 5, the engagement portion 179 extends circumferentially between the mate faces 178. The engagement portion 179 includes a backside face 175 (FIGS. 4-5) opposite the seal face 173 relative to the radial direction R.

The seal 169 includes an internal cavity 184 established by the main body 170. The internal cavity 184 extends inwardly from a pair of openings 185 along each of the respective mate faces 178. The engagement portion 179 defines a portion of the internal cavity 184, as illustrated by FIGS. 3-4. The internal cavity 184 can be substantially enclosed along the main body 170 between the openings 185, as illustrated by FIG. 4. The internal cavity 184 can be dimensioned to span or extend circumferentially between the mate faces 178. The internal cavity 184 can be configured to receive cooling flow in operation, such as from the cooling source CS (FIG. 2), to cool adjacent portions of the seal 169.

Figure 6:
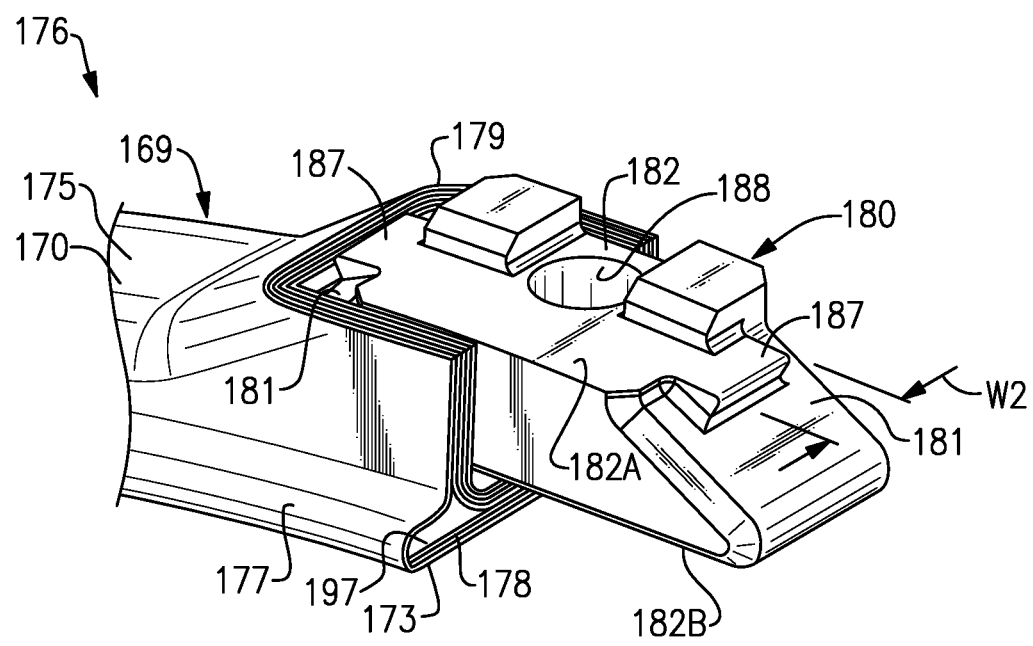
FIG. 6 illustrates a perspective view of a mounting block inserted into the seal of FIG. 5.
Figure 10:
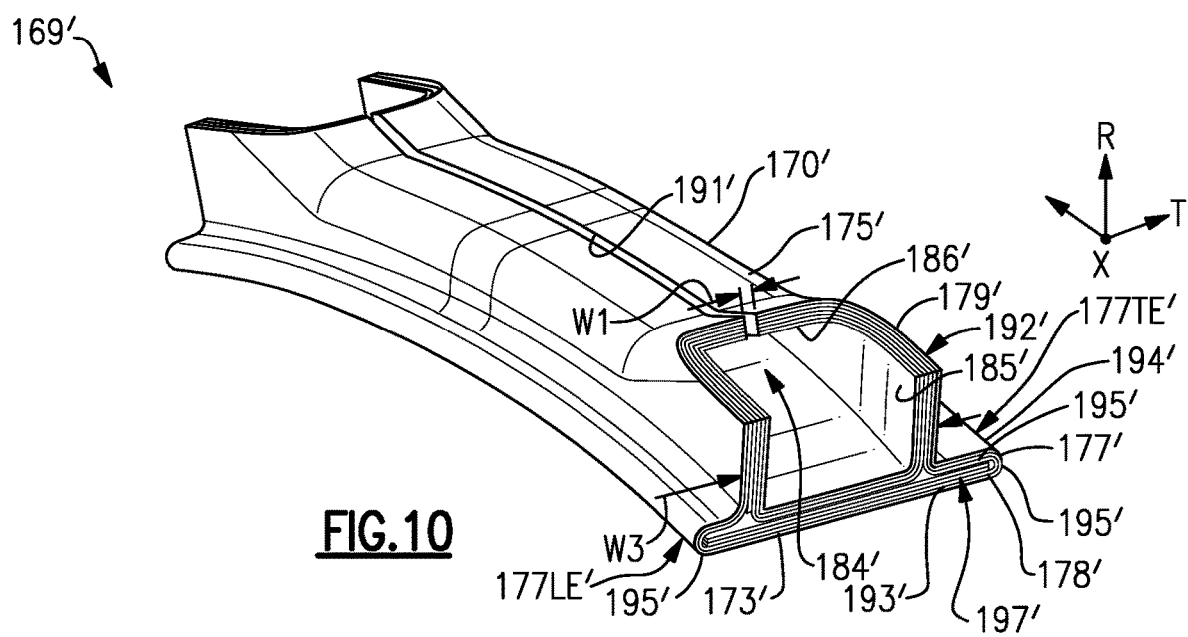
FIG. 10 illustrates a perspective view of a seal according to another example.
Figure 11:
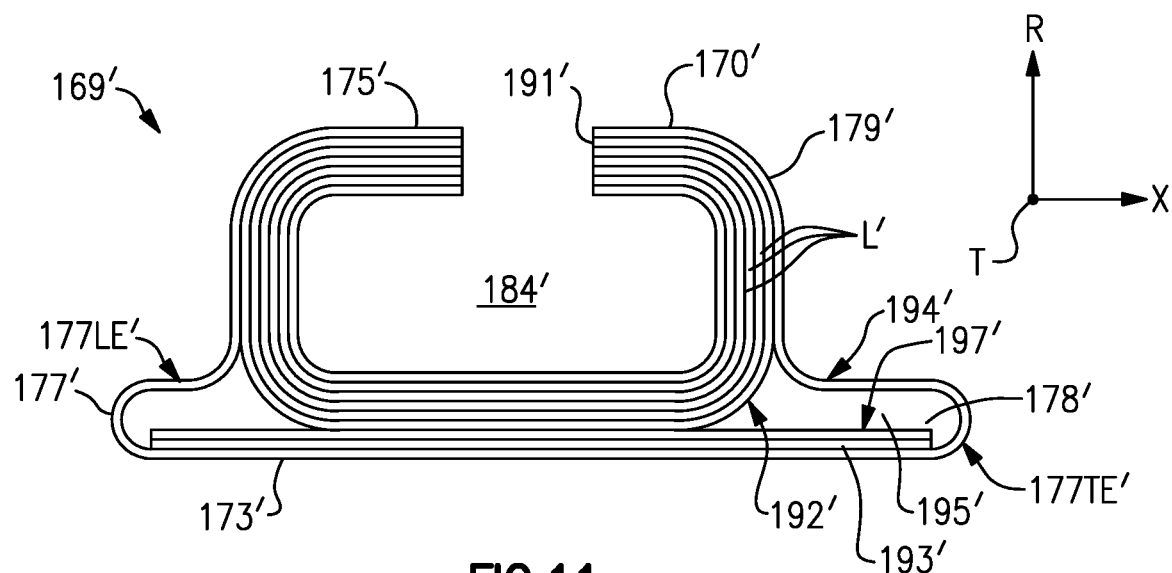
FIG. 11 illustrates a sectional view of the seal of FIG. 10.

In the illustrative example of FIGS. 10-11, seal 169' includes at least one opening such as an elongated slot 191' extending radially between internal cavity 184' and a backside face 175' of the seal 169'. The slot 191' can be dimensioned to extend along a length of the internal cavity 184', as illustrated by FIG. 10. In examples, the slot 191' extends a first width W1 (FIG. 10), and the retention feature 187 extends a second width W2 (FIG. 6). The first width W1 is less than the second width W2. The engagement portion 179 extends a third width W3 (FIG. 10) in the thickness direction T. The slot 191' can be dimensioned such that the first width W1 is no more than approximately 5 or 10 percent of the third width W3 for each position, or at least a majority of positions, along the slot 191'. The slot 191' can be utilized to compensate for differential thermal growth and reduce thermal stresses in the component.

Referring to FIGS. 4 and 6, with continuing reference to FIGS. 3 and 5, each mounting block 180 secures one or more of the seals 169 to a housing such as engine case 137, or to another portion of the engine static structure 36 (FIG. 1). The mounting block 180 includes at least one interface portion 181 extending outwardly from a main body or mounting portion 182. In the illustrated example of FIGS. 4 and 6, the mounting block 180 includes a pair of opposed interface portions 181 that extend outwardly from the mounting portion 182. Each interface portion 181 is dimensioned to abut the engagement portion 179 of the respective seal 169 to limit relative movement between the mounting block 180 and the seal 169 in the radial and/or circumferential directions, for example.

A cross-section of the mounting block 180 can have a generally trapezoidal geometry, as illustrated by FIGS. 4 and 6. Ends of the interface portions 181 can be contoured to guide the interface portions 181 during insertion into the respective internal cavities 184 in an installed position. In the illustrative example of FIGS. 4 and 6, each of the interface portions 181 has a dovetail geometry. Surfaces of each interface portion 181 slope outwardly between a top 182A and bottom 182B of the mounting portion 182. The dovetail geometry and contouring of the interface portions 181 can reduce mechanical stress on the seal 169, including seals made of a composite material which can be strong but relative brittle. The dovetail geometry of the interfaces portion 181 circumferentially overlaps with the engagement portions 179 when in the installed position to secure adjacent pairs of the seal assemblies 176 to the engine case 137, as illustrated by the seal assemblies 176A, 176B of FIG. 4.

Each interface portion 181 can include an outwardly extending retention feature 187. The retention feature 187 is dimensioned to abut against surfaces of the engagement portion 179 to seat the seal 169 during assembly and limit circumferential and/or radial movement, as illustrated by the retention features 187 of FIG. 4.

The mounting block 180 can be mechanically attached or otherwise secured to the engine case 137 using one or more fasteners 190 (one shown in FIGS. 3-4 for illustrative purposes). Each mounting portion 182 defines an aperture 188 that receives a respective fastener 190 to mechanically attach the mounting portion 182 to the engine case 137 and limit relative movement of one or more seals 169. In the illustrated example of FIGS. 3-4, the fastener 190 is a bolt, and the aperture 188 threadably receives a length of the bolt. Other fasteners such as pins, rivets and clips, and other techniques such as welding can be utilized to secure the mounting block 180 to the engine static structure 136.

The seal assemblies 176A, 176B are arranged in close proximity such that the respective mate faces 178A, 178B establish an intersegment gap G that extends a distance in the circumferential direction T, as illustrated in FIG. 4. The mounting block 180 is dimensioned to span across the intersegment gap G. A portion of the fastener 190 can be circumferentially aligned with one or more of the adjacent mate faces 178A, 178B and/or the intersegment gap G. The mounting block 180 is arranged between the engagement portions 179A, 179B to circumferentially space apart the seals 169A, 169B. Each mounting block 180 secures an adjacent pair of the engagement portions 179A, 179B to the engine case 137 when in the installed position.

Each engagement portion 179A, 179B includes ramped surfaces 186A, 186B extending along the internal cavity 184A, 184B. The ramped surfaces 186A, 186B extend transversely from internal surfaces bounding the internal cavity 184A, 184B. Each interface portion 181 of the mounting block 180 is dimensioned to be inserted into or otherwise extend through a respective one of the openings 185A, 185B to abut against and mate with the ramped surfaces 186A, 186B to support the adjacent seals 169A, 169B and to limit or bound circumferential, radial and/or axial movement of the seals 169A, 169B relative to the engine case 137 and engine axis A.

Figure 8:
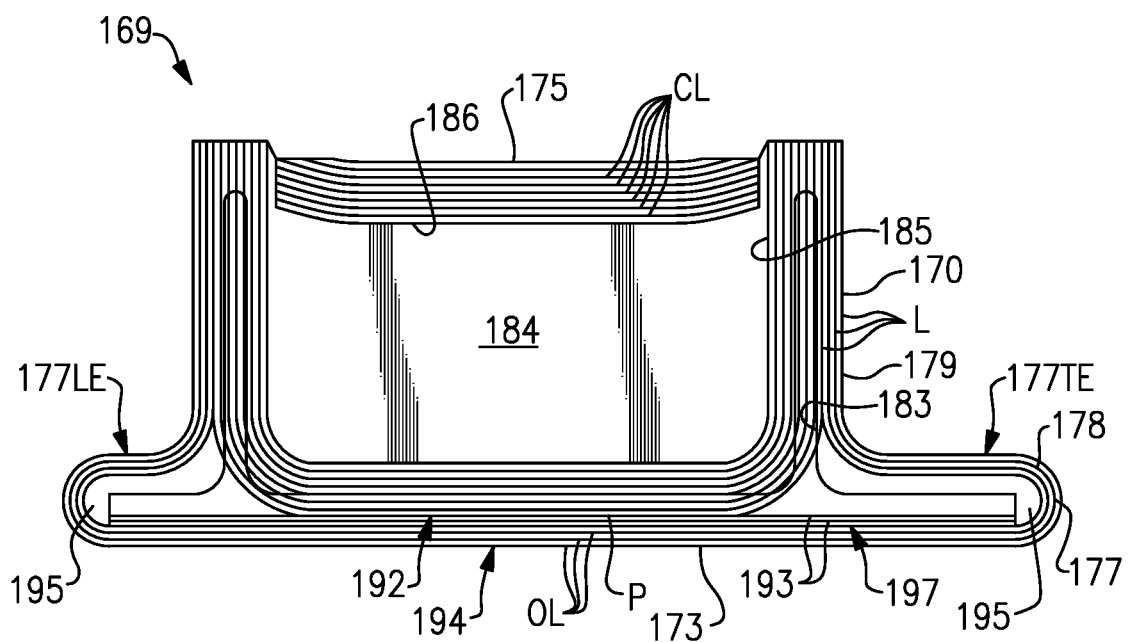
FIG. 8 illustrates an end view of the seal of FIG. 5.
Figure 9:
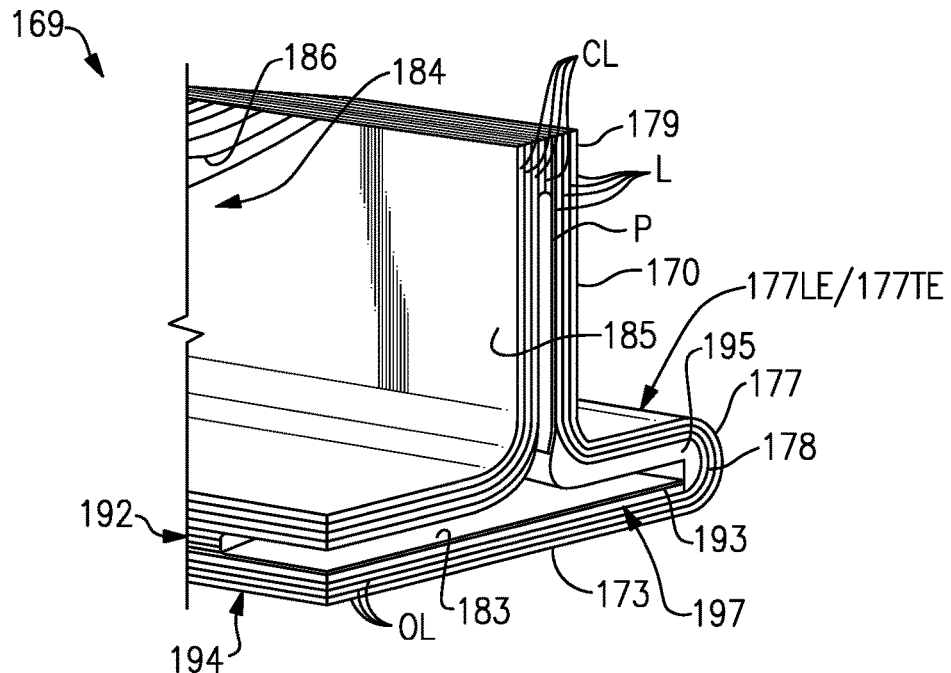
FIG. 9 illustrates a perspective view of selected portions of the seal of FIG. 5.

The seal 169 can include slots 183 along the respective mate faces 178, as illustrated by FIGS. 8-9. Each slot 183 can be dimensioned to extend along surfaces of the platform insert 197, as illustrated by FIGS. 8-9. Each slot 183 can be dimensioned to receive a seal member SM (shown in dashed lines in FIG. 4 for illustrative purposes). The seal member SM can be a feather seal, for example, and can be dimensioned to span between the mate faces 178 of adjacent seals 169 to reduce a likelihood of ingestion of hot combustion gases from the gas path GP being communicated into and through the intersegment gap G, as illustrated by the arrangement of the mate faces 178A, 178B and seal member SM of FIG. 4. The slots 183 can be formed by an ultrasonic machining technique, for example. The slot 183 can be dimensioned to substantially align with a direction of adjacent core and/or overwrap layers CL, OL, which can reduce a likelihood of strength degradation of the adjacent layers CL, OL.

Various materials can be utilized to form the seal 169 and mounting block 180. The seal 169 is made of a first material, and the mounting block 180 is made of a second material, which can be the same or can differ from the first material. For example, the first material can include a ceramic or ceramic matrix composite (CMC) material such as silicon carbide (SiC) fibers in a silicon carbide (SiC) matrix. The seal 169 can be formed from one or more layers L (FIG. 7-8) of a composite layup. In other examples, the seal 169 is made of another material, such as a high temperature metal, alloy, or composite material. The mounting block 180 can be made of a high temperature composite, metal, or alloy, such as a nickel-based superalloy, for example. The seal 169 can have a unitary construction. In other examples, the sealing portion 177 and engagement portion 179 are separate and distinct components that are mechanically attached to one another with one or more fasteners.

Figure 7:
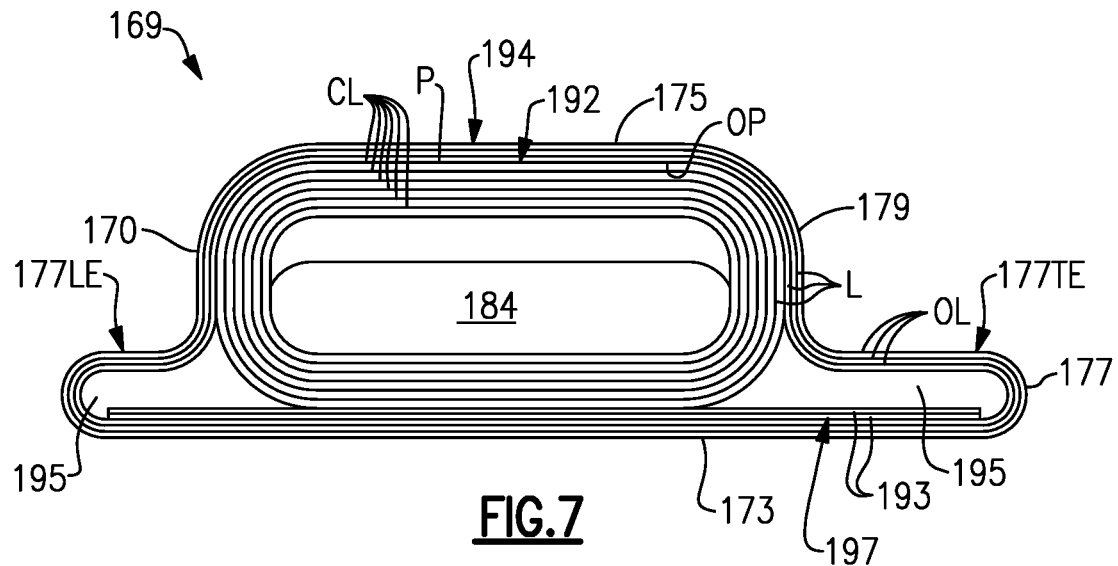
FIG. 7 illustrates a sectional view of the seal taken along line 5-5 of FIG. 5.

In the illustrative example of FIGS. 7-9, the seal 169 is formed from a plurality of plies or layers L (see also L' of FIG. 11). The main body 170 of the seal 169 includes at least a core 192 and an overwrap 194. The main body 170 can include a platform insert 197 dimensioned to extend between portions of the core 192 and the overwrap 194 to establish at least the sealing portion 177, as illustrated by FIGS. 7-9. The platform insert 197 can have a substantially planar geometry and can be dimensioned to extend within the sealing portion 177 between opposed portions of the overwrap 194, including portions of the overwrap 194 that establish leading and trailing edge segments 177LE, 177TE of the sealing portion 177, as illustrated by FIGS. 7-9. The leading and trailing edge segments 177LE, 177TE extend circumferentially between the mate faces 178. The platform insert 197 has a third construction, which can be the same or can differ from the first and/or second fiber constructions. For example, the platform insert 197 can be a monolithic component constructed from a metal material, a glass material and/or a ceramic material, which can be the same or different ceramic material as the core 192 and/or overwrap 194. In examples, the platform insert 197 is made of a homogenous monolithic ceramic or glass-ceramic. Example metal materials can include high temperature metals or alloys, including any of those disclosed herein.

In examples, the platform insert 197 includes at least one or more interstitial or intermediate (or platform) plies or layers 193. The main body 170 can include one or more fillers 195. The intermediate layer(s) 193 and/or fillers 195 can be situated between portions of the core 192 and/or overwrap 194 to establish the sealing portion 177, as illustrated in FIGS. 7-9. Various materials can be utilized to form the intermediate layer(s) 193 and filler(s) 195, including any of the materials disclosed herein. The intermediate layer(s) can serve to increase rigidity of the sealing portion 177 adjacent to regions established by the fillers 195 and can improve thermal performance along the gas path wall established by the sealing portion 177.

The core 192 includes one or more core plies or layers CL. The overwrap 194 includes one or more overwrap plies or layers OL. The layers L of the seal 169 comprise the core and overwrap layers CL, OL and the intermediate layer(s) 193. In the illustrative example of FIGS. 7-9, the seal 169 includes six separate and distinct core plies CL, three separate and distinct overwrap plies OL, and two separate and distinct intermediate layers 193. It should be understood that fewer or more than six core plies CL, three overwrap plies OL and two intermediate layers 193 can be utilized in accordance with the teachings disclosed herein.

The core and overwrap plies CL, OL and intermediate layers 193 are arranged in stacked relation to establish the main body 170 of the seal 169. The core plies CL are arranged to establish an inner, generally tubular shaped box. The overwrap plies OL are arranged to establish an outer, generally tubular shaped box that substantially encloses the inner box to establish a double box architecture. The inner box established by the core plies CL can serve to provide structural support, and the outer box established by the overwrap plies OL can serve to provide additional structural support and enclose other features such as the intermediate layer(s) 193 and filler(s) 195 to establish a cross-sectional profile of the seal 169.

The core and/or overwrap plies CL, OL and/or intermediate layer(s) 193 can be dimensioned to extend from, and span circumferentially between, the mate faces 178. The continuous inner and outer box arrangement can reduce a likelihood of delamination of the plies CL, OL. The core plies CL are arranged to establish the internal cavity 184. The overwrap plies OL of the overwrap 194 are arranged to follow a perimeter P of the core 192 comprising the core plies CL to establish the sealing portion 177 and engagement portion 179. The overwrap 194 can be dimensioned to surround the perimeter P of the core plies CL at circumferential positions along the internal cavity 184, as illustrated by FIG. 7. The core plies CL follow an inner periphery or passageway OP of the overwrap 194, as illustrated by FIG. 7. The core plies CL establish the ramped surfaces 186 and can be arranged to space apart the overwrap plies OL of the overwrap 194 from the internal cavity 184, as illustrated by FIG. 8. The ramped surfaces 186 can be utilized to improve non-binding thermal growth of the mounting block 180. The internal cavity 184 can serve to provide an area where a cross section of the seal 169 is allowed to change to accommodate thermal distortions of the engine case 137.

Various materials can be utilized to form the core and overwrap plies CL, OL and the intermediate layer(s) 193. The plies CL, OL and/or intermediate layer(s) 193 can be constructed from fibers made of the same material or different materials. In examples, the core plies CL, overwrap plies OL and/or intermediate layer(s) 193 include silicon-based fibers in a silicon-based ceramic matrix such as silicon carbide fibers (SiC) in a silicon carbide (SiC) matrix to establish a ceramic matrix composite (CMC) component. Other materials can be utilized to construct the core plies CL, overwrap plies OL and/or intermediate layer(s) 193, and corresponding matrix materials, such as oxide-based chemistries.

Various fiber constructions can be utilized for the core and overwrap plies CL, OL and intermediate layer(s) 193. The core plies CL have a first fiber construction. The overwrap plies OL have a second fiber construction, which can be the same or can differ from the first fiber construction. Each intermediate layer 193 of the platform insert 197 has a third fiber construction, which can be the same or can differ from the first and/or second fiber constructions. The first, second and third fiber constructions can include any of the fiber constructions or patterns disclosed herein. Example fiber constructions include unidirectional fibers and fabrics including woven fibers.

In examples, the first and second fiber constructions of the core and overwrap plies CL, OL comprise substantially continuous fibers, and the third fiber construction of each intermediate layer 193 comprises substantially discontinuous fibers. For the purposes of this disclosure, the term "continuous" means a construction in which fibers in the respective ply or layer wrap or extend more than one full rotation about an axis of the component. For the purposes of this disclosure, the term "discontinuous" means a construction in which fibers in the respective ply or layer do not wrap or extend more than one full rotation about an axis of the component. For the purposes of this disclosure, the term "substantially" with respect to "continuous" means a construction in which at least 97% of the bias and other non-axial fibers in the respective ply or layer wrap or extend more than one full rotation about an axis of the component. For the purposes of this disclosure, the term "substantially" with respect to "discontinuous" means a construction in which no more than 3% of the fibers or tows of fibers in the respective ply or layer wrap or extend more than one full rotation about an axis of the component.

FIGS. 12A-12K illustrate example fiber constructions 189 (indicated at 189A-189K). In examples, the core and/or overwrap plies CL, OL are constructed from braided plies including a plurality of braided yarns forming a weave, and the intermediate layer(s) 193 are constructed from a woven fabric. For example, the overwrap plies OL can include a plurality of biaxially braids 189A (shown in FIG. 12A), and core plies CL can include a plurality of triaxially braids 189B (shown in FIG. 12B), or vice versa. In other examples, the layup of the core and/or overwrap plies CL, OL include alternating layers of biaxially braided and triaxially braided plies.

Figure 12A:
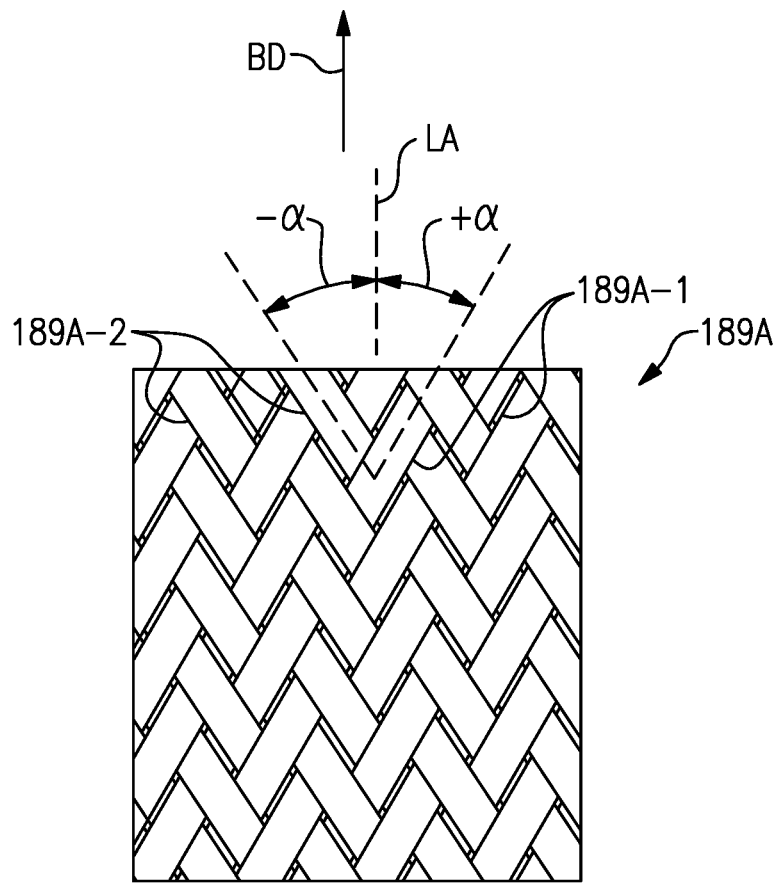
FIG. 12A illustrates biaxially braided yarns.
Figure 12F:
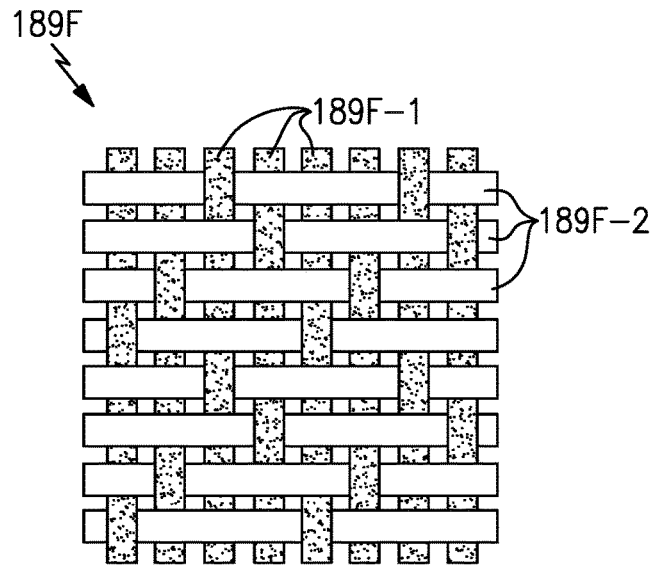
FIG. 12F illustrates a four-harness satin weave.
Figure 12G:
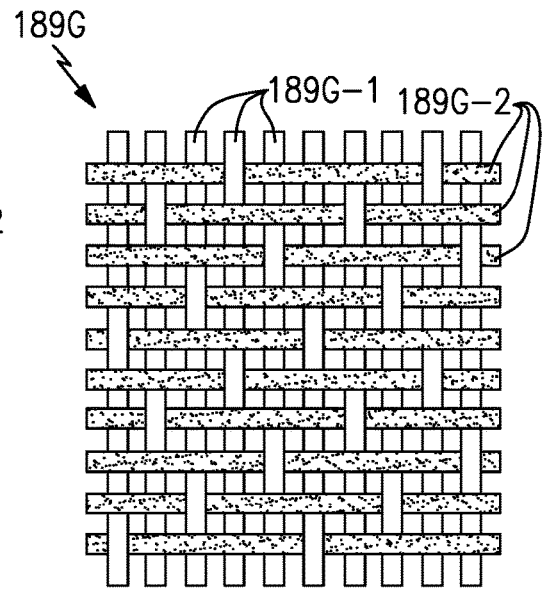
FIG. 12G illustrates a five-harness satin weave.
Figure 12H:
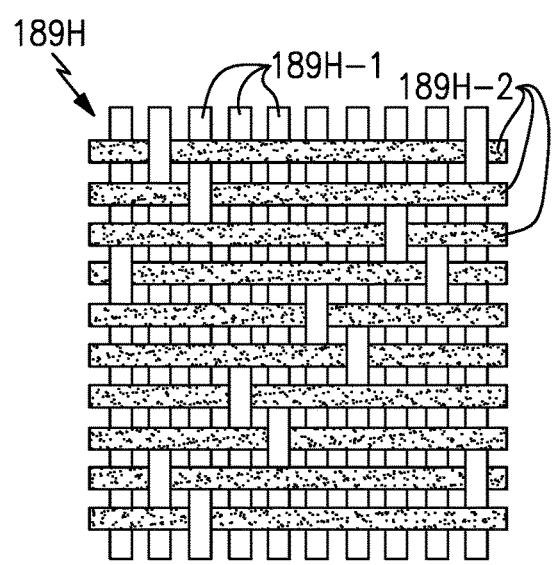
FIG. 12H illustrates an eight-harness satin weave.
Figure 12I:
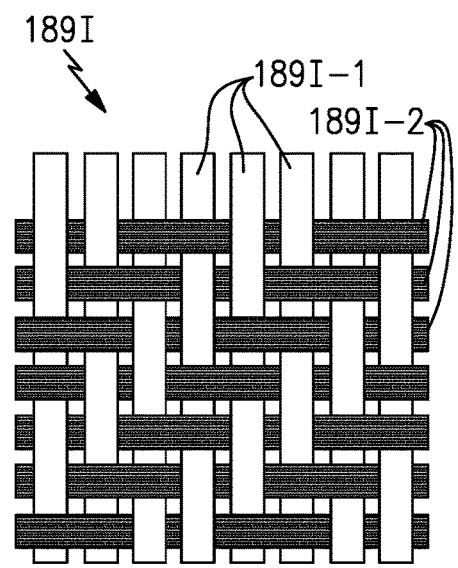
FIG. 12I illustrates a twill weave.
Figure 12K:
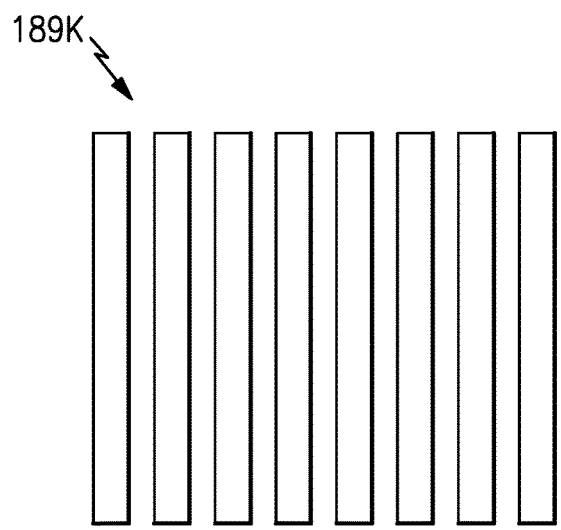
FIG. 12K illustrates a unidirectional pattern.

Referring to FIG. 12A, the biaxially braid 189A includes a first set of bias tows 189A-1 interlaced with a second set of bias tows 189A-2. The bias tows 189A-1, 189A-2 are illustrated as being arranged in a 2×2 pattern. However, other patterns such as a 1×1 pattern can be utilized. The bias tows 189A-1, 189A-2 are arranged to establish respective positive and negative bias angles α with respect to a longitudinal axis LA generally extending in a braid direction BD. The tows can be arranged such that the 0° angle used herein has a major component extending in the circumferential direction X (FIGS. 3-4) of the seal 169. The bias angle α of each of the bias tows 189A-1, 189A-2 can be less than or equal to approximately 45 degrees, absolute. In examples, the bias angle α of each of the bias tows 189A-1, 189A-2 approaches 0 degrees, absolute, such as between approximately 30 degrees and approximately 40 degrees, absolute. For purposes of this disclosure the terms "substantially" and "approximately" mean ±3% of the stated value unless otherwise disclosed. In examples, the second fiber construction of each overwrap ply OL is a +/−38° biaxial braid. The relatively shallow bias angles α of the bias tows 189A-1, 189A-2 can compensate for a lack of axial fibers in the respective ply.

Referring to FIG. 12B, the triaxially braid 189B includes first and second sets of bias tows 189B-1, 189B-2 and a set of axial tows 189B-3 interlaced with the bias tows 189B-1, 189B-2. Each axial tow 189B-3 is arranged along a longitudinal axis LA generally extending in a braid direction BD. The bias tows 189B-1, 189B-2 are arranged to establish respective positive and negative bias angles α with respect to the longitudinal axis LA. In examples, the bias angle α of each of the bias tows 189B-1, 189B-2 is greater than or equal to approximately 45 degrees, absolute. In examples, the bias angle α of each of the bias tows 189B-1, 189B-2 approaches 90 degrees, absolute, such as between approximately 60 degrees and approximately 70 degrees, absolute. For the purposes of this disclosure, the 90° position is normal to the axial or braid direction BD. In examples, the first fiber construction of each core ply CL is a 0°, +/−65° triaxial braid. The axial tows can provide thermal resistance to thermal uncurling. The relatively steep bias angles α of the bias tows 189B-1, 189B-2 can improve strength in the hoop direction (e.g., thickness and/or radial directions R, T).

The biaxial braid 189A and triaxial braid 189B can include different fiber types in the braid axial and braid bias directions to tailor the strength and stiffness of the core and/or overwrap plies CL, OL. For example, higher modulus fibers may be used in conjunction with lower modulus fibers. Other fiber constructions can be utilized to form the core and/or overwrap plies CL, OL, including any of the fiber constructions disclosed herein.

Figure 12J:
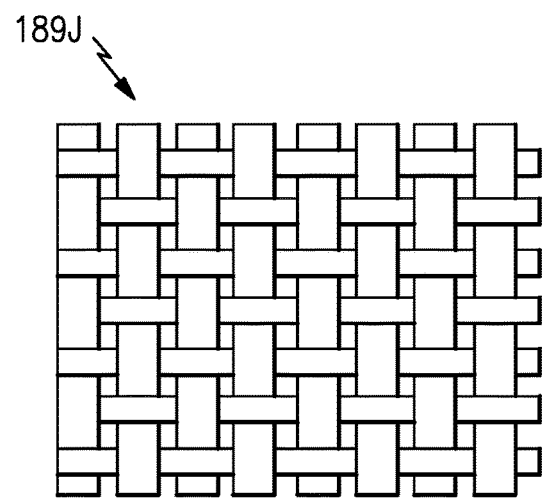
FIG. 12J illustrates a plain weave.

Example fabrics include a three-dimensional woven fabric 189C (FIG. 12C), a non-crimp fabric 189D (FIG. 12D), and/or a two-dimensional woven fabric 189E (FIG. 12E) can be utilized to form any of the layers CL, OL and/or intermediate layers 193 disclosed herein. Other example fabrics that can be utilized include satin weaves. Example satin weaves include four-to-eight harness satin weaves such as a four-harness satin weave 189F (FIG. 12F), a five-harness satin weave 189G (FIG. 12G) and an eight-harness satin weave 189H (FIG. 12H) having warp tows 189F-1/189G-1/189H-1 interlaced with weft tows 189F-2/189G-2/189H-2. Other example configurations include a plain weave (FIG. 12K), and a twill weave 189I including warp tows 189I-1 interlaced with weft tows 189I-2 (disclosed as a 2×2 pattern in FIG. 12I). The warp tows or the weft tows can be dimensioned to substantially span between the mate faces 178. Other example constructions include a one-dimensional unidirectional pattern 189J (FIG. 12J). There may also be variations within each fiber construction, such as the relative angles of the fibers and tows relative to one another. In examples, the intermediate layer 193 is constructed from a section of a biaxial or triaxial braided weave in which the continuous fibers are severed and the section is flattened or otherwise formed with respect to a predefined geometry of the platform insert 197.

Figure 13:
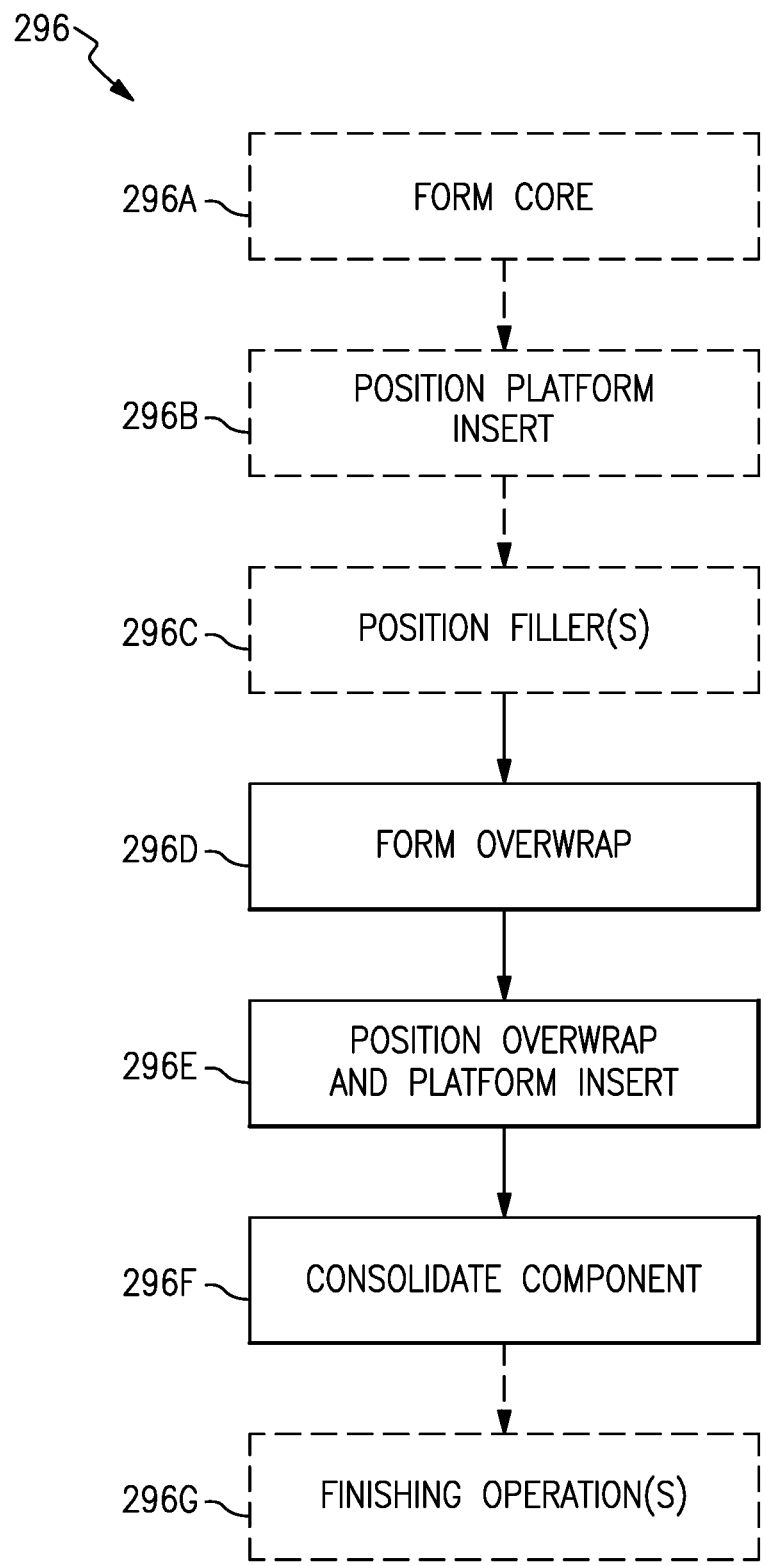
FIG. 13 illustrates a process for forming a component.

FIG. 13 illustrates a process of constructing or forming a component in a flow chart 296. The process 296 can be utilized to form a gas turbine engine component, including the seals 69, 169, or another component such as static vanes and struts, for example. Reference is made to the seal 269 of FIGS. 14-17 for illustrative purposes, which disclose exemplary states of fabrication of the component in the process 296.

Figure 14:
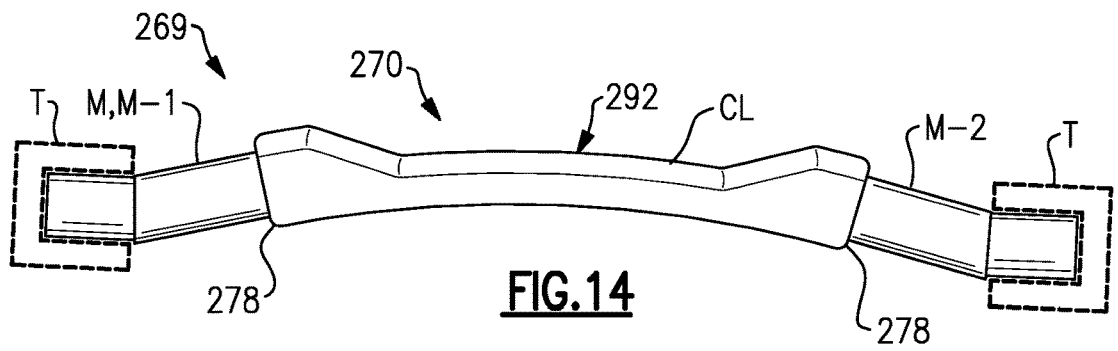
FIG. 14 illustrates a core layup on a pair of mandrels.

Referring to FIGS. 13-14, a core 292 of a main body 270 is formed at step 296A. Step 296A includes laying up or forming one or more core plies CL along at least one mandrel M. The core plies CL can include any of the materials and fiber constructions disclosed herein. In examples, a total of six core plies CL are triaxially braided about or over the mandrel M. In the illustrative example of FIG. 14, the mandrel M includes a pair of mandrels M-1, M2 arranged in an opposed relationship. The mandrels M-1, M2 are constructed according to a predefined geometry of an internal cavity of the main body 270 (see, e.g., cavity 184 of FIGS. 4 and 7-8). The mandrels M-1, M-2 can be held in tooling T (shown in dashed lines for illustrative purposes).

The tooling T can be operable to change an orientation or position of the mandrels M-1, M-2 during fabrication.

Figure 15:
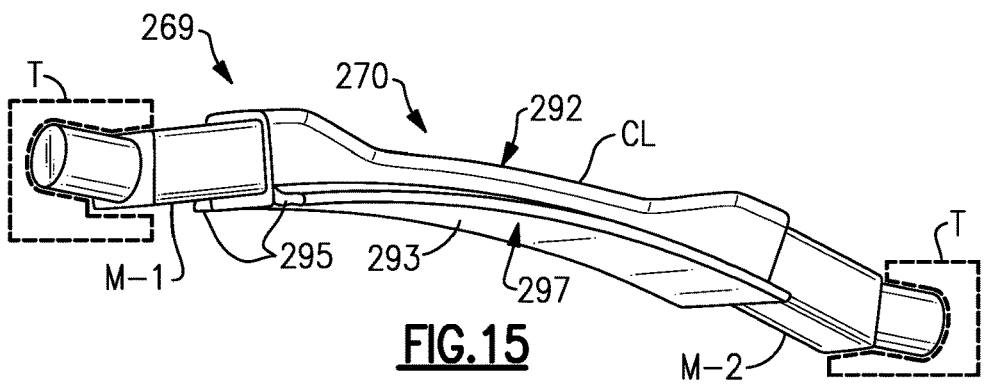
FIG. 15 illustrates a platform insert and fillers positioned relative to the core layup and the pair of mandrels of FIG. 14.

Referring to FIGS. 13 and 15, a platform insert 297 is situated or positioned along the core plies CL of the core 292 at step 296B. The platform insert 297 can include at least one or more intermediate (or platform) plies or layers 293 situated or laid up along the core plies CL of the core 292. One or more fillers 295 can be situated or positioned along the core plies CL at step 296C. The platform insert 297 including the intermediate layer(s) 293 and the fillers 295 can include any of the materials and fiber constructions disclosed herein. In examples, the filler 295 is made of chopped fibers in a matrix.

Figure 16:
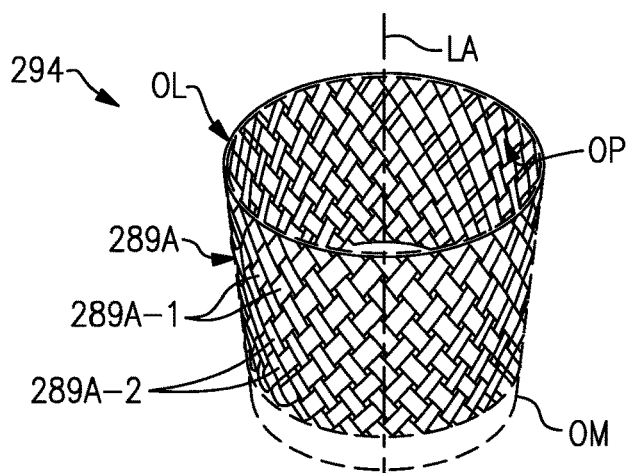
FIG. 16 illustrates an overwrap layup formed on a mandrel.

Referring to FIGS. 13 and 16, an overwrap 294 is formed at step 296D. Step 296D includes laying up or forming one or more overwrap plies OL over an overwrap mandrel OM (shown in dashed lines for illustrative purposes. The overwrap mandrel OM can have a generally cylindrical geometry, for example. The overwrap plies OL can include any of the materials and fiber constructions disclosed herein. In examples, a total of three overwrap plies OL are biaxially braided about or over the overwrap mandrel OM. The overwrap plies OL are formed such that a passageway OP is established (see also FIG. 7).

Figure 17:
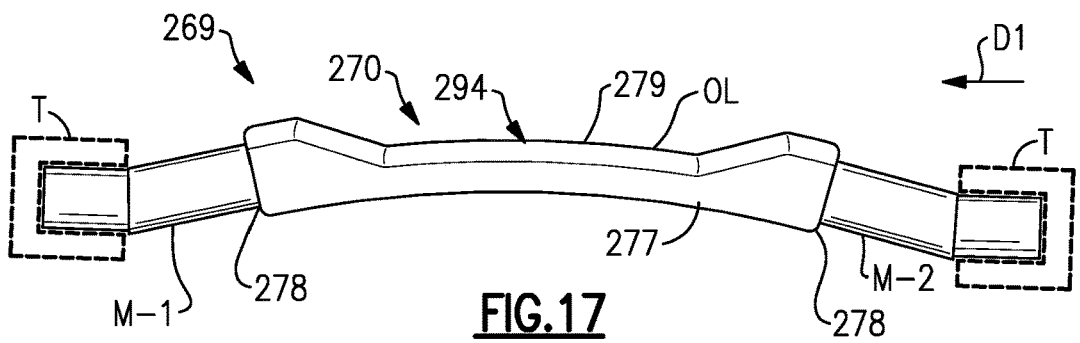
FIG. 17 illustrates the overwrap layup positioned relative to the core layup of FIG. 15.

Referring to FIGS. 13 and 17, the overwrap 294 and platform insert 297 are positioned or situated relative to the core plies CL (FIGS. 13-14) of the core 292 and mandrels M-1, M-2 at step 296E. Step 296E can include inserting the core plies CL (FIGS. 13-14) and platform insert 297 (FIG. 15) at least partially into the passageway OP such that the core 292, overwrap 294 and platform insert 297 cooperate to establish a sealing portion 277 and such that at least the core 292 and overwrap 294 cooperate to establish an engagement portion 279. Step 296E can include moving the overwrap 294 in a direction D1 along a length of the mandrels M-1, M-2. The sealing and engagement portions 277, 279 can be arranged as disclosed by the sealing and engagement portions 177, 179 of the seal 169 to establish the seal assembly 176 including mounting block 180, for example. Steps 296A-296E occur such that an integral preform is established. The overwrap 294 of FIG. 16 including the passageway OP can be shaped to a predefined contour of the component, which can correspond to an outer periphery of the mandrels M-1, M-2 and core 292, as illustrated in FIG. 17. Steps 296A, 296B and 296E can occur such that the core and overwrap plies CL, OL and/or platform insert 297 including the intermediate layer(s) 293 span between the mate faces 278, as illustrated by FIGS. 14-15 and 17.

The component is consolidated at step 296F. Step 296F can include embedding the fibers of the seal 269 in a matrix material, such as carbon-based fibers in a carbon-based ceramic matrix, including silicon carbide (SiC) fibers in a silicon carbide (SiC) matrix. Step 296F includes removing the mandrels M-1, M-2 from the main body 270 to establish an internal cavity spanning circumferentially between openings along the mate faces 278 (see, e.g., the cavity 184 of FIGS. 7-8 and openings 185 of FIGS. 5-6 and 8). Various techniques can be utilized to establish the matrix, including chemical vapor infiltration (CVI) or a melt infiltration (MI) technique. Thereafter, the component is cured in a mold to establish an integral component.

One or more finishing operations can be performed on the component at step 296G. Step 296G can include machining one or more surfaces of the component. Step 296G can include forming one or more features in the component such as an elongated opening or slot (see, e.g., slot 191' of FIGS. 10-11).

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of fabricating a seal for a gas turbine engine, comprising:
    forming a hollow core including a plurality of triaxially braided core plies along at least one mandrel;
    positioning a platform insert including at least one intermediate ply along the core, the at least one intermediate ply having a fiber construction of substantially discontinuous fibers;
    forming an overwrap including a plurality of biaxially braided overwrap plies that establish a passageway; and
    inserting the core plies and the platform insert at least partially into the passageway such that the core, the platform insert and the overwrap cooperate to establish a sealing portion, wherein the sealing portion extends circumferentially between opposed mate faces, the core and the overwrap cooperate to establish an engagement portion having an opening along each of the mate faces, and the opening is dimensioned to receive a respective mounting block.

2. The method as recited in claim 1, wherein the core plies and the overwrap plies comprise silicon carbide fibers, and further comprising:
    embedding the silicon carbide fibers in a ceramic matrix.

3. The method as recited in claim 1, wherein the at least one mandrel is a pair of mandrels arranged in an opposed relationship, the sealing portion establishes a seal face on a first side of the seal, the engagement portion establishes a backside face on a second side of the seal opposite the first side, and further comprising:
    removing the pair of mandrels from the core to establish an internal cavity in an interior of the core, the internal cavity spanning circumferentially between the openings along the mate faces, and the internal cavity bounded radially between a first wall of the sealing portion establishing the seal face and a second wall of the engagement portion establishing the backside face.

4. The method as recited in claim 3, wherein the steps of forming the core and the overwrap occur such that the biaxially and triaxially braided plies and the at least one intermediate ply span between the mate faces.

5. The method as recited in claim 4, wherein the step of forming the core occurs such that an absolute bias angle of bias tows in the respective core plies is between 60 degrees and 70 degrees.

6. The method as recited in claim 5, wherein the step of forming the overwrap occurs such that an absolute bias angle of bias tows in the respective overwrap plies is between 30 degrees and 40 degrees.

7. The method as recited in claim 3, further comprising: forming an elongated slot in the second wall of the engagement portion, the elongated slot extending inwardly from the backside face to the internal cavity.

8. The method as recited in claim 7, wherein the elongated slot extends along a length of the internal cavity.

9. The method as recited in claim 7, wherein a width of the elongated slot is less than a width of the opening along each of the mate faces.

10. The method as recited in claim 1, wherein the at least one intermediate ply comprises a fabric.

11. The method as recited in claim 10, wherein the fabric is woven.

12. The method as recited in claim 11, wherein the fabric is a satin weave including warp tows interlaced with weft tows, and the warp tows or the weft tows are dimensioned to span between the mate faces.

13. The method as recited in claim 1, wherein the seal is a blade outer air seal (BOAS).

14. The method as recited in claim 13, wherein the step of forming the core occurs such that an absolute bias angle of bias tows in the respective core plies is between 60 degrees and 70 degrees.

15. The method as recited in claim 14, wherein the step of forming the overwrap occurs such that an absolute bias angle of bias tows in the respective overwrap plies is between 30 degrees and 40 degrees.

16. A method of fabricating a seal for a gas turbine engine, comprising:

forming a hollow core including a plurality of triaxially braided core plies along a pair of mandrels arranged in an opposed relationship;

positioning a platform insert along the core;

forming an overwrap including a plurality of biaxially braided overwrap plies that establish a passageway;

inserting the core plies and the platform insert at least partially into the passageway such that the core, the platform insert and the overwrap cooperate to establish a sealing portion extending circumferentially between opposed mate faces, wherein the core and the overwrap cooperate to establish an engagement portion having an opening along each of the mate faces, the opening is dimensioned to receive a respective mounting block; and removing the pair of mandrels from the core to establish an internal cavity in the core, wherein the internal cavity spans between the openings along the mate faces, and the internal cavity is bounded between a first wall of the sealing portion establishing a seal face and a second wall of the engagement portion establishing a backside face.

17. The method as recited in claim 16, wherein the platform insert comprises a metal material.

18. The method as recited in claim 16, wherein platform insert includes at least one intermediate ply along the core, and the at least one intermediate ply having a fiber construction of substantially discontinuous fibers.

19. The method as recited in claim 16, wherein:

the step of forming the core occurs such that an absolute bias angle of bias tows in the respective core plies is between 60 degrees and 70 degrees; and the step of forming the overwrap occurs such that an absolute bias angle of bias tows in the respective overwrap plies is between 30 degrees and 40 degrees.

20. The method as recited in claim 19, wherein the seal is a blade outer air seal (BOAS).

* * * * *